Figure 1:
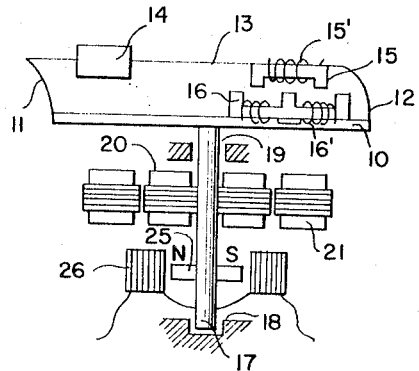

Feb. 21, 1967          CARL-ERIK GRANQVIST          3,304,786
ACCELEROMETER ESPECIALLY FOR NAVIGATIONAL PURPOSES
Filed Feb. 27, 1961                                3 Sheets-Sheet 1

INVENTOR
CARL ERIK GRANQVIST

BY Larson and Taylor
ATTORNEYS

Feb. 21, 1967    CARL-ERIK GRANQVIST    3,304,786
ACCELEROMETER ESPECIALLY FOR NAVIGATIONAL PURPOSES
Filed Feb. 27, 1961    3 Sheets-Sheet 2

INVENTOR
CARL ERIK GRANQVIST

BY *Larson and Taylor*

ATTORNEYS

Feb. 21, 1967     CARL-ERIK GRANQVIST     3,304,786
ACCELEROMETER ESPECIALLY FOR NAVIGATIONAL PURPOSES
Filed Feb. 27, 1961     3 Sheets-Sheet 3

INVENTOR
CARL ERIK GRANQVIST
BY Larson and Taylor
ATTORNEYS

United States Patent Office 3,304,786
Patented Feb. 21, 1967

3,304,786
ACCELEROMETER ESPECIALLY FOR
NAVIGATIONAL PURPOSES
Carl-Erik Granqvist, Lidingo, Sweden, assignor to AGA Aktiebolag, a corporation of Sweden
Filed Feb. 27, 1961, Ser. No. 91,728
Claims priority, application Sweden, Apr. 25, 1960, 4,077/60
2 Claims. (Cl. 73—517)

An accelerometer is an instrument, by means of which one measures the acceleration of a body. Such instruments are used for different purposes, amongst which are scientific research purposes observations when shooting off rockets, in inertia navigation and the like.

The present invention refers to an accelerometer. Although the accelerometer comprised by the invention is in first place intended to be contained as part of an equipment for inertia navigation of air-craft, it may also be used for different purposes in addition to this, and the invention shall therefore not be regarded as limited to an accelerometer for inertia navigation or even for some deliberate kind of navigation.

The simplest and most commonly occurring accelerometer consists in a pendulum, which is hinged in such a way, that it can make an indication in a plane, which contains the direction of acceleration. If the body is at rest, and the position of the pendulum is stabilized, it will hang vertically down. If the body is thereafter put into an accelerated movement in the horizontal plane then the pendulum will make an indication in an angle, determined by the magnitude of the acceleration.

The pendulum, used as an accelerometer, has several advantages. It is a very simple instrument. It is, so to say, self-calibrating, that means in the equation indicating the relation between the acceleration and the indication of the pendulum no unknown or variable magnitude such as spring constants or the like is contained. The pendulum can be made with a very high degree of accuracy. If, however, the acceleration of the body takes place in a path, which also contains a vertical component, which will practically always be the case when the accelerometer is used as a navigation instrument on board an air-craft, the measured acceleration value will lose its importance, because the value asked for is the horizontal acceleration without regard to possibly simultaneously occurring vertical acceleration. It is true that one has proposed to avoid the influence of the vertical component of the acceleration by compulsorily keeping the pendulum in the vertical position and measuring the power, required for this purpose. Such an arrangement will only give an expression for the horizontal acceleration, but the accuracy will be very much less, and also indetermined, because different foreign circumstances are now introduced in the chain of measurement, such as the amplification factor in an amplifier possibly provided for, the strength of magnetic fields, which have for their purpose to lock the pendulum in the vertical position, and so on.

It has also been proposed to provide an accelerometer in the form of a mass, which is allowed to move in horizontal direction against the action of a spring. Such an accelerometer certainly is free of vertical components, but the indication will instead be dependent upon spring constants. Normally one has further to provide a specific reader for reading the movement of the mass against the action of the spring and this can cause the introduction of errors. The reader usually is electromagnetic and therefore requires an amplifier, and also the characteristic of this amplifier may cause certain errors.

The present invention refers to an accelerometer, in which the disadvantages accounted for above are done away with. The invention is based upon the principle, that one should compare the linear acceleration, which should be measured, with a centrifugal acceleration, by which the value of the acceleration asked for may be obtained as the relation between voltages, time intervals, or angles. In this measuring method no amplification value, spring constants or similar circumstances are contained as error creating magnitudes in the result. An instrument according to the invention can therefore be produced in such a way, that it will in a very high degree of accuracy, indicate the acceleration in any desired plane, but preferably in the horizontal plane. The only constant, contained in the measuring result, is formed by the centrifugal force, but this need not cause any ambiguity, because one can without any difficulty determine the rotational speed (number of turns) as well as the radius of the rotating mass.

According to the invention, therefore a mass body is so arranged in a rotating system, that it will normally be situated eccentrically relative to the system, and a reader is provided for measuring the movements of the mass body under influence of the centrifugal force as well as the acceleration force but against the action of a spring force. Means are combined with the reader for deriving the acceleration force from the state thus measured.

Figure 2:
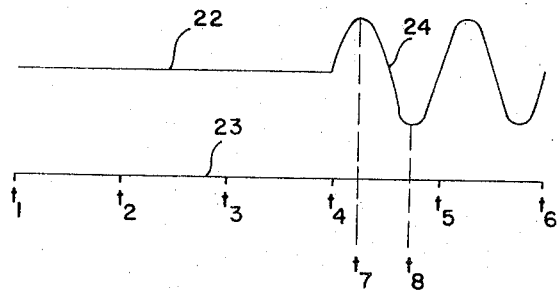
Figure 3:
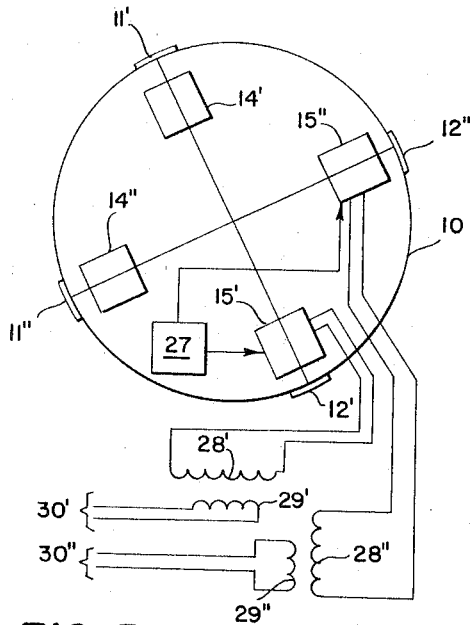
Figure 9:
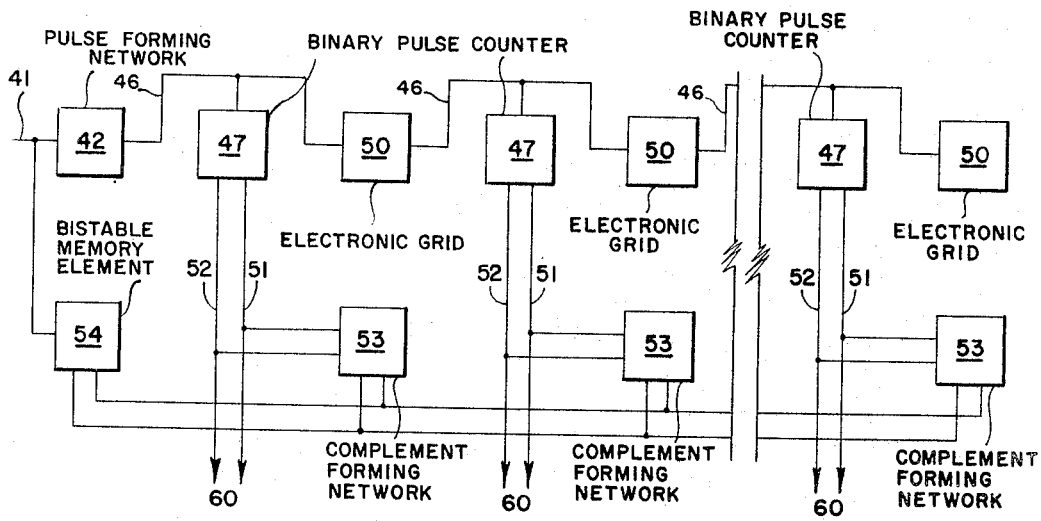
Figure 10:
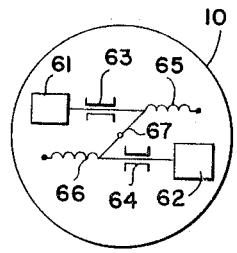
Figure 11:
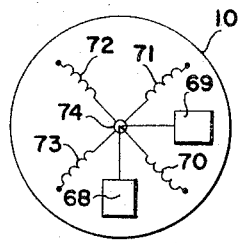
Figure 12:
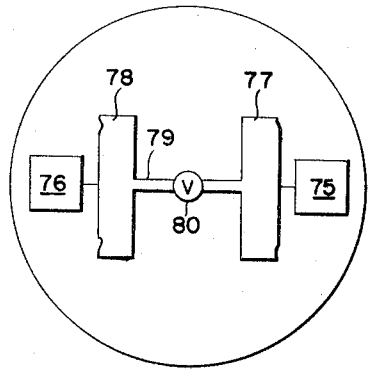

The invention will be further described below in connection with the attached drawings, which show a number of different forms of execution of the invention. FIG. 1 shows a schematic picture of the rotating parts, and FIG. 2 shows a curve for explaining, how the acceleration force and the centrifugal force are composed. FIG. 3 shows the rotating parts in a level perpendicular to the one in FIG. 1, and FIGS. 4, 5, 6 and 7 show different diagrams for explaining the function of the arrangement according to the invention. FIG. 8 shows a wiring diagram of the measuring system for reverting the state obtained from the arrangement according to FIG. 1 or 3 into a statement about the acceleration, and FIG. 9 shows the same wiring diagram in a complete form, but in the form of a block-diagram. FIGS. 10, 11 and 12, finally show different variations of the arrangement according to FIG. 1 or 3 in the same schematical way of reproduction as used in the last mentioned figures.

FIG. 1 in schematic form shows the main parts of an accelerometer according to the invention. On a rotating fundamental disc 10 there are at diametrically opposite places provided two springs 11 and 12, between which a wire or the like 13 is spanned. The wire 13 carries a mass body 14 as well as the one part of a voltage reader 15, the other part 16 of which is rigidly combined with the disc 10. The voltage reader functions in a way known per se in such a way, that a high frequency alternating current is fed to two mutually counteracting windings 16' on a magnetic core 16, whereby an alternating current may be induced in a winding 15' surrounding a magnetic core 15.

In the position of symmetry shown in the drawing the magnetic fields from the core 16 equally and counteractingly influence the core 15, and in its winding 15' there will be no voltage created. If the core 15 is displaced in one direction, for instance inwardly in radial direction relative to the disc 10, then, however, the symmetry will be disturbed, and a voltage is created in the winding 15'. The alternating voltage is changing phase by 180° in the position, in which the arrangement is shown in FIG. 1, so that one can state by a phase comparison the position of the core 15 with reference to the core 16, and thereby the position of the mass body 14.

The disc 10 is mounted on a shaft 17, which is carried in the bearings 18 and 19. On the shaft 17 the rotor 20 of a driving motor with a stator 21 is mounted.

The mass body 14 is normally placed in an off-axis position in relattion to the disc 10, and it will therefore be subjected to a centrifugal force when the disc 10 is rotating, the magnitude of which is determined by the rotational speed $\omega$ of the disc 10 and by the rotational radius $r$. This centrifugal force is compensated for by the resilience in the springs 11 and 12, and the mass body 14 will assume a certain position on a given radius, on which it will remain, provided that the rotational speed $\omega$ remains constant. This centrifugal force co-operates in given positions with the influence of the acceleration force on the mass body 14, but in other positions the two forces will counteract each other. If no acceleration should exist then the mass body 14 will remain in a constant radial position, relative to the disc 10. The horizontal line 22 in FIG. 2 indicates the amplitude of the alternating current then induced in winding 15', assuming that the line 23 indicates the amplitude zero, when the disc 10 is not rotating and the core 15 is symmetrically disposed with regard to the core 16 and the winding 16'. The distance between the lines 22 and 23 therefore indicates the displacement of the mass body, created due to the centrifugal force, when the rotation describes the three turns from $t_1$ to $t_4$. It is now assumed, that at the time $t_4$ suddenly an acceleration occurs, so that the inertia force created by the acceleration on the mass body will act in a direction, which is displaced by 90° relative to the position of the mass body at the times $t_1$, $t_2$, $t_3$, and $t_4$. The two forces will therefore co-operate in the position $t_7$ and counteract each other in the position $t_8$. The amplitude of the voltage in the output winding from the reader 15, 16 therefore will vary according to a sinus formed curve, as indicated in FIG. 2 within the interval from the time $t_4$ to the time $t_6$. However, it is reminded about that as a matter of fact, the voltage is an alternating voltage, and that the shown curve therefore only is an envelope curve.

It is evident from the above, that the radial displacement of the mass body 14 and consequently also the constant amplitude of the alternating current represented by the distance between the zero line 23 and the line 22 is proportional to $\omega^2 rm$, in which expression $\omega$, as earlier, indicates the angular speed of the rotation of the disc 10, whereas $r$ indicates the gravity point radius of the mass body and $m$ indicates its mass. It is also evident, that the amplitude of the alternating voltage, which is at 24 superimposed on the constant oscillation, will be $\pm ma$, in the expression $m$ as above indicates the mass of the mass body and $a$ indicates the acceleration. One can now assume that the expression $\omega^2 rm$ is known as to its magnitude, and consequently the "modulation degree" of the modulated alternating voltage, as it is as a matter of fact expressed by the curve 24, will indicate the strength of the acceleration.

In this way one can determine the magnitude of the acceleration. The direction of the acceleration is suitably determined by means of a reference generator, which in the simplest case may consist in a permanent magnet 25 in combination with a pair of coils 26. The output alternating voltage from the stator coil 26 will obtain a fixed phase position relative to the disc 10, and by measuring the phase difference between the voltage wave 24 and the oscillation obtained from the coil 26 one will directly get the direction of the acceleration.

It is very important, that the self-frequency of the resilient systems is widely different from the rotational frequency of the rotating system, because otherwise resonance phenomena would occur which would completely disturb the obtained measuring result. Suitably the arrangement is made in such a way that the rotating system rotates with a substantially lower frequency than the natural frequency of the resilient system. Thereby, one is also avoiding the risk of a resonance between the rotation and one or more harmonics of the resilient system.

Even if one can in this way mainly avoid disturbances through resonance phenomena, these cannot be fully obviated. In order that they be damped down to small values that can be tolerated, and that they should not observably disturb the accuracy of the measuring result, one may cause all of the system to rotate in a fluid, for instance silicon oil.

For navigatory purposes it is usually desired, that one should obtain a statement about the acceleration in a Cartesian or orthogonal co-ordinate system. For this purpose one arranges in the practically executed accelerometer two resilient systems, each of which having its own mass body and its own reader, as shown in FIG. 3. In this figure one will again find the disc 10, and further each of the two systems, the components of which have been indicated by the same reference numerals as in FIG. 1, however, regarding the one system they have been provided with a prime, and regarding the second one with a second at the side of the reference numerals.

The readers are fed with a common high frequency alternating voltage $E \cdot \sin \omega_1 t$ from an oscillator 27. It is without decisive importance to the invention, in what way the alternating voltage from the oscillator 27 is transferred to the rotating disc and the means arranged on it. It has therefore been shown schematically. From the readers 15' and 15", respectively, the secondary voltages are conducted to coils 28' and 28" rotating with the disc 10 to provide, respectively, the primary windings of a pair of inductive commutators. The fixed secondary windings of these commutators, coils 29' and 29", respectively, are connected to the terminals 30' and 30", respectively, which may be combined with any suitable angular measuring instrument, for instance with an automatic goniometer, which will thereby directly indicate the input direction of the acceleration. A second instrument is arranged for indicating the magnitude of the acceleration. The kind of this instrument will be further described below.

It is suitable to keep the angular measuring instrument which may be combined with the terminals 30' and 30" of FIG. 3 orientated in given directions, for instance by means of a gyroscopic device or by means of a servo compass, so that the components of the acceleration which fall in the north-south direction and in the east-west direction can be deduced.

Figure 4:
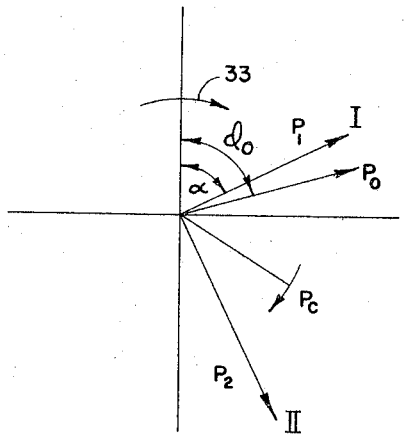

For deriving the magnitude of these components reference is made to the diagram in FIG. 4. The rotation is assumed to take place in the direction of the arrow 33 with an angular speed of $d\alpha/dt = \omega$. Further it is assumed, that the linear acceleration acts in the direction $\varphi_0$ and is of the magnitude $P_0$. The centrifugal acceleration force is indicated by $P_c$. The force on the system I and II, of the accelerometers, FIG. 4, is indicated by $P_1$ and $P_2$, respectively. The two forces may be expressed as:

$$P_1 = P_0 \cos (\varphi_0 - \alpha) + P_c \text{ and}$$
$$P_2 = P_0 \sin (\varphi_0 - \alpha) + P_c, \text{ resp.}$$

These two forces develop voltages from the secondary sides of the readers, which may be expressed as:

$$E_1 = [E_0 \cos (\varphi_0 - \alpha) + E_c] \sin \omega_1 t \text{ and}$$
$$E_2 = [E_0 \sin (\varphi_0 - \alpha) + E_c] \sin \omega_1 t, \text{ resp.}$$

In the last mentioned equation, $E_0$ and $E_c$, respectively, indicate the amplitude components of the high frequency alternating voltage which correspond to the forces $P_0$ and $P_c$, respectively. The two voltage components are now divided up in the above mentioned way into two components, one of which falling in the North-South-direction, and the other one in the East-West-direction. The component $E_{ov}$ falling in the East-West-direction can then be written as:

$$E_{ov} = [E_0 \cos (\varphi_0 - \alpha) \sin \alpha + E_0 \sin (\varphi_0 - \alpha) \cos \alpha + E_c (\cos \alpha + \sin \alpha)] \sin \omega_1 t$$

Reformulated according to known trigonometric laws this equation will give:

$$E_{ov} = E_0 \sin \varphi_0 \sin \omega_1 t + \sqrt{2} E_c \sin \omega_1 t \sin (\alpha + 45°)$$

and in a corresponding way one will obtain the voltage in the North-South-direction as:

$$E_{ns}=E_o \sin \varphi_o \sin \omega_1 t + \sqrt{2} E_c \sin \omega_1 t \sin (\alpha + 45°)$$

The simplest way of deducting the two voltages $E_{ov}$ and $E_{ns}$ would be to cause the two windings 28' and 28" to be rigidly connected to the disc, so that they rotate with the number of turns of the disc 10, the two windings 29' and 29" however, being combined with a gyro compass or other suitable device for keeping them directed in the East-West-direction or the North-South-direction, respectively. Thereby the above indicated voltages will occur directly in the output terminals of the coils 29' and 29", respectively. It will be evident from the two equations mentioned above for $E_{ov}$ and $E_{ns}$, that the linear acceleration will occur in the form of a non-modulated term. Further it is seen, that the centrifugal acceleration will be $\sqrt{2}$ times the coefficient for the linear acceleration.

Figure 5:
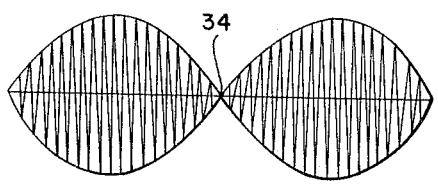
Figure 6:
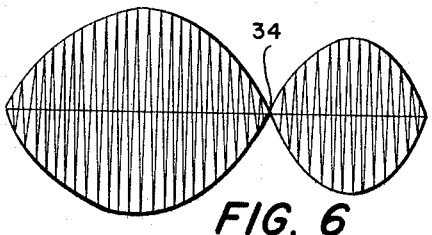

The oscillations represented by the one of the above indicated equations, for instance the equation for $E_{ov}$, is shown in FIGS. 5 and 6, respectively, FIG. 5 showing the oscillation in the case, that no linear acceleration occurs, whereas linear acceleration occurs in the state, shown in FIG. 6. In both cases the question is one about an alternating voltage, which is entered inside an envelope curve. It is easily seen, that one can obtain a value for the acceleration either by measuring maximum of the envelope curve during the one half period, and during the other half period, respectively, and compare these two maximum values, or by a time measurement, because the zero cutting place 34 of the curves will be displaced, when an acceleration occurs.

Figure 7:
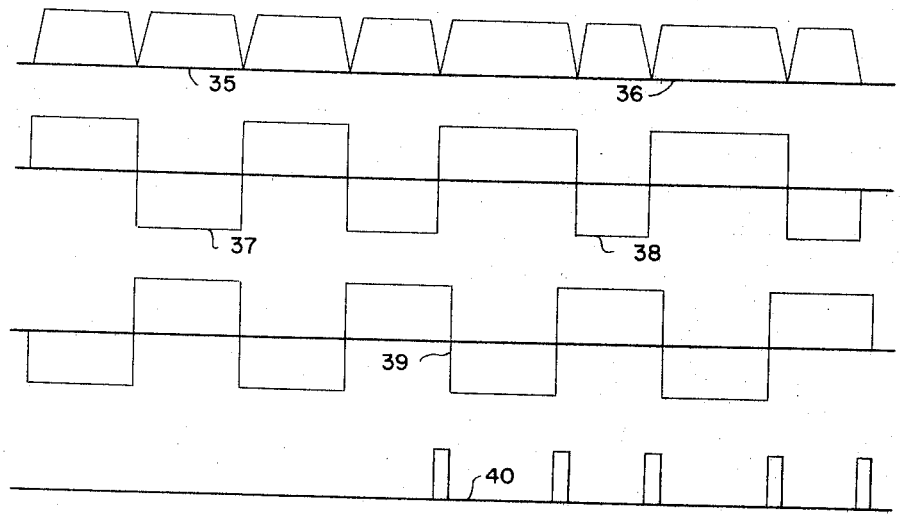
Figure 8:
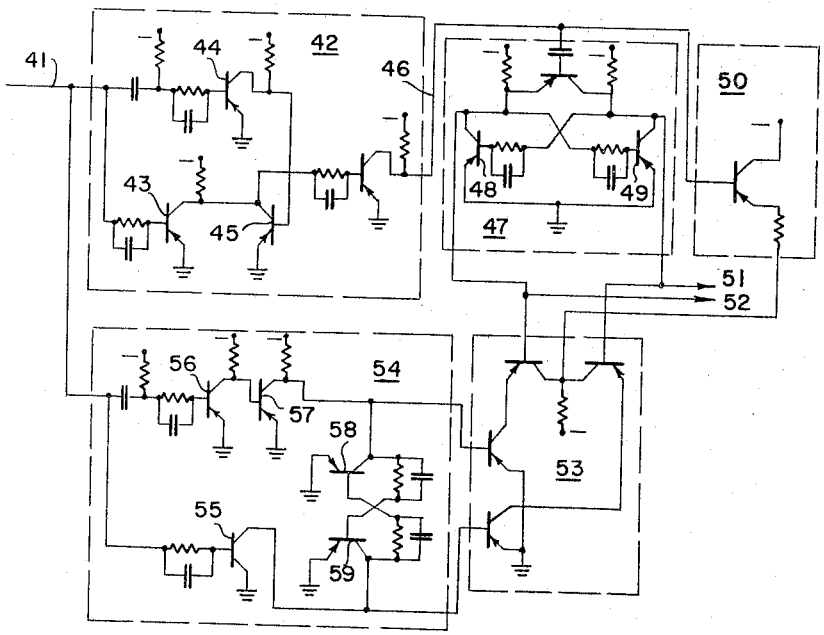

If a wave of the kind shown in FIGS. 5 and 6, respectively, is amplified and rectified in a detector with a strong voltage limitation, then one will obtain a resulting voltage of the kind, shown in FIG. 7 by means of the curve 35, or 36, respectively. The first mentioned curve refers to the oscillation shown in FIG. 5, and the last mentioned to the oscillation shown in FIG. 6. It is however, remained about the matter of fact, that the two half waves are of opposite phase. If one would in connection with the amplification and rectification under limitation also cause a modulation with the oscillator frequency, for instance in a phase modulator, then the curves 35 and 36 would therefore turn over into the form, indicated by 37 and 38, respectively. A reference generator placed on the shaft of the accelerometer, for instance of the kind as shown in FIG. 1 by 25 and 26, will give off a voltage, which is treated the same way, and one will then obtain from the last mentioned voltage a curve of the type, shown in FIG. 7 by 39. By subtraction between the two curves one will then obtain a series of pulses of the kind, indicated by means of 40 in FIG. 7. The length of time of these pulses will, as will be seen from the above depend upon the acceleration. It should thereby be observed that at acceleration in the opposite direction (retardation) the short and the long pulses in the curce 38, change their places. In order then to obtain a pulse series of the time 40 one has to turn the poles of the curve 39, for which purpose a suitable switch has to be inserted in the conduits for this voltage. Possibly, one can instead use two additional devices, the one for adding the curves in the way shown in FIG. 7, and the other one for adding the curve 38 to a curve, which forms the inverted value of the curve 39.

However, one can provide a measurement of a corresponding kind by directly measuring the number of half waves in the curve according to FIG. 6 of the high frequency voltage. This, in the simplest way takes place by amplifying the oscillations under limitation and rectifying them in a phase detector. Such a counting may without any difficulty be provided by means of modern electronic counters. The simplest way of obtaining the statement in a digital form would be directly to connect a binar electronic counter, for instance according to Eccles-Jordan, which will add the number of positive pulses and subtract the number of negative pulses or vice versa.

In the arrangement according to FIG. 8 the conductor for the input pulses is indicated by 41. It runs to a pulse forming network of a kind known per se, generally indicated by 42. This network contains two parallel circuits for pulse turning, the one provided with one transistor 43 and the other one provided with two transistors 44, 45. Consequently, all of the pulses will be given off in the same direction, even if they are directed differently, when they enter over the conductor 41.

The output conduit from the pulse forming network 42 is indicated by 46. It runs to a binar pulse counter 47 according to Eccles-Jordan with two transistors 48, 49. Further the conductor 46 runs to an electronic grid 50 of a kind known per se. The output conductors 51, 52 from the binar counter run to some suitable marking means, not shown in FIG. 8, and also to a complementary or complement forming network 53, which is thus fed on its one side from the binar counter 47. On its other side the complement forming network 53 is fed from a bistable memory element 54, which contains a pulse turning device of a character, which is to some degree similar to the part 42, and which consists in the transistors 55 in the one circuit and 56, 57, in the other circuit, as well as contains an Eccles-Jordan-element, consisting in the transistors 58 and 59.

The elements 50, 53 and 54 are repeated a suitable number of times for making counting of the required number of binar-units possible. The way of repeating the connection of the elements will be seen from FIG. 9. In FIG. 9 the conductors 60 are fed to a lamp table, a mathematic machine, a register for recalculation of the binar number into a decimal number or the like. Such arrangements being known per se, and not forming part of the present invention, they have not been further shown in the drawing.

The principle of the arrangement described above in connection with FIGS. 8 and 9 is, that all of the pulses should be reverted into negative pulses and should be fed in this form to the binar counters over electronic grids, which exclude any tendency of a positive pulse to enter to the counters. The bistable element 54 acts in such a way, that it changes over the complement forming networks, as soon as a positive pulse enters, which causes the binar counters to calculate these positive pulses backwardly, that means under subtraction. One will thus obtain the difference between the positive pulses, reverted into negative pulses, and the remaining, initially pulses in the above indicated way. Each pulse represents half a wave of the curve shown in FIG. 6, and the total number of counted pulses will therefore indicate the numerical value of the pulse length of the pulses 40 in FIG. 7, or with other words a unitary proportional measure of the magnitude of the acceleration.

It is obvious, that one can easily by integration of the acceleration derive an expression for the speed and by renewed integration derive an expression for the performed distance. Such instruments are known per se, and could, of course, be connected to the output mathematic conductor 60.

The arrangement, which has been taken in order of resiliently loading the mass bodies against the action of centrifugal force and acceleration force, respectively, may of course be varied. Some such variations are shown in FIGS. 10, 11 and 12. In the arrangement according to FIG. 10, both of the mass bodies 61 and 62, respectively, are arranged displaceable in guides 63 and 64, respectively, against the action of springs 65 and 66, respectively. They are connected with an arm 67 running through the centre of the disc 10, so that they will compulsorily transfer their movements to each other. The arm 67 has the character of a double arm lever. It is easily seen, that if the two parts of this lever should be equally long, then no reaction should occur at all for the acceleration force, but the mass bodies would exclusively move dependent upon the centrifugal force. By making the one arm shorter than the other one (in the drawing the lower arm, which is shorter than the upper arm), one may however provide a reaction also for the acceleration force. By suitable choice of the length on the arms concerned one may in any desired way vary the relation between the influence of the centrifugal force and the influence of the acceleration force.

FIG. 11 shows an arrangement, in which the mass bodies 68, 69 are hinged in a system of four springs 70, 71, 72 and 73, which are fixed between one common support plate 74, on the one side, and fixed points on the disc 10, on the other side.

FIG. 12, finally shows an arrangement, in which one is not using fixed springs but pneumatic or hydraulic resilient arrangements. The mass bodies 75 and 76 are here fixed to the membrane coverings of separate membrane boxes 77 and 78, respectively, said boxes being in communication with each other by means of a conduit 79, which is either so narrowly dimensioned in itself, that it causes an essential resistance against movement of the medium existing in the membrane boxes, or which contains a choke device for instance a choke valve 80 for the same purpose. If the membrane boxes are filled with a liquid medium, the membranes themselves should be hinged resiliently. If, however, the membrane boxes are filled with a gaseous medium, the compressibility of this medium may be sufficient for creating the required resilience.

The invention, of course, is not limited to the forms of execution thereof, shown in the drawing or described above in detail, but all kinds of different modifications may occur within the frame of the invention.

What I claim is:

1. An accelerometer for measuring horizontal acceleration comprising a disc rotating about a vertical axis, two mass bodies spaced from the axis, each one supported by a wire diametrically disposed on the disc and connected therewith by means of springs for supporting the mass body for movement along a straight path extending diametrically to the disc and in a plane perpendicular to the axis, a reader connected with the mass body for measuring movements of the mass body due to forces acting thereon, means for feeding the reader with a high frequency alternating current, means cooperating with the reader for modulating said alternating current with a modulating voltage representing the forces acting on the mass body, the wire supporting one mass body being perpendicular to the wire supporting the other mass body.

2. An accelerometer according to claim 1 and further comprising means for deriving components of the modulated output voltages from the readers which represent components of the acceleration falling in the north-south direction and the east-west direction, respectively, and for combining the output from one reader with the corresponding output from the other reader for providing a signal indicating direction and magnitude of the acceleration.

References Cited by the Examiner

UNITED STATES PATENTS

| | | | |
|---|---|---|---|
| 2,210,970 | 8/1940 | Bonell | 73—517 |
| 2,570,672 | 10/1951 | Hathaway | 73—514 |
| 2,638,556 | 5/1953 | Hausz | 73—516 |
| 2,726,074 | 12/1955 | Ketchledge | 73—507 |
| 2,928,667 | 3/1960 | Peterson | 73—503 |
| 3,014,374 | 12/1961 | Johnston | 73—517 |

FOREIGN PATENTS 791,827   3/1958   Great Britain.

RICHARD C. QUEISSER, *Primary Examiner.*

SAMUEL LEVINE, *Examiner.*

JAMES J. GILL, *Assistant Examiner.*